(No Model.)  2 Sheets—Sheet 1.

E. W. ROBINSON.
ELECTRIC EXERCISING MACHINE.

No. 418,227. Patented Dec. 31, 1889.

Witnesses
Aly. L. Hayes
Herbert A. Hall

Inventor
E. W. Robinson

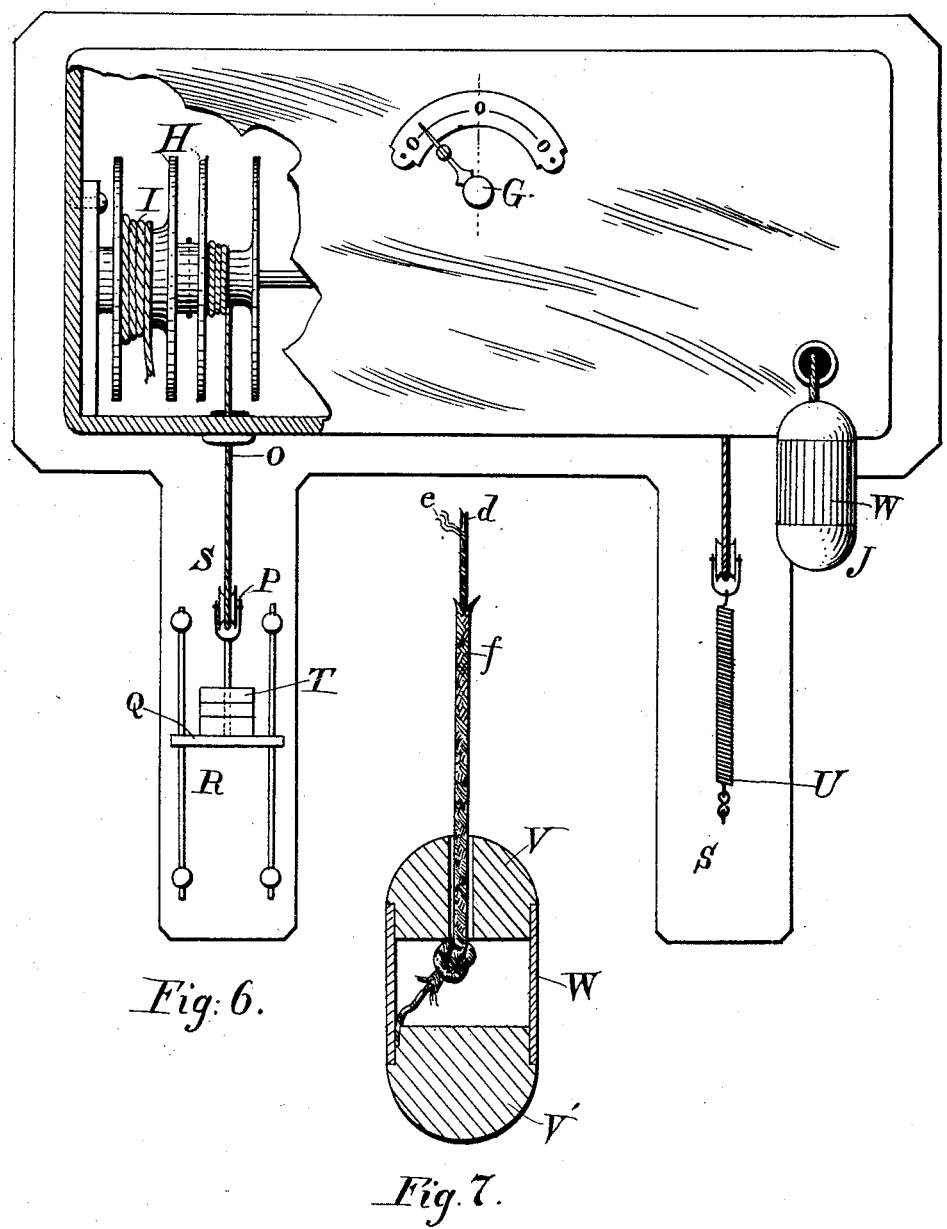

UNITED STATES PATENT OFFICE.

EDWARD W. ROBINSON, OF BOSTON, MASSACHUSETTS, ASSIGNOR TO THE ELECTRIC EXERCISING MACHINE COMPANY, OF NASHUA, NEW HAMPSHIRE.

ELECTRIC EXERCISING-MACHINE.

SPECIFICATION forming part of Letters Patent No. 418,227, dated December 31, 1889.

Application filed July 3, 1889. Serial No. 316,478. (No model.)

*To all whom it may concern:*

Be it known that I, EDWARD W. ROBINSON, of Boston, in the county of Suffolk and State of Massachusetts, have invented a new and useful Improvement in Electric Exercising-Machines, of which the following, taken in connection with the accompanying drawings, is a specification.

This invention relates to that form of electric exercising-machine which is described in Letters Patent of the United States, No. 375,835, dated January 3, 1888, and in which there is combined with the shaft of the rotating part of a dynamo one or two reels, upon which are wound cords provided with handles, which cords, when pulled, are unwound from the reels and thus rotate the shaft and the moving part of the dynamo, thereby producing electric currents, which, by suitable connections, are conveyed through the body of the person pulling upon the cords, and in which machine there is also combined with the shaft of the rotating part of the dynamo springs or weights, which afford a counteracting force to the force exerted to unwind the cords and act when the pulling force is relaxed to wind up the cords.

The invention consists, first, in the combination, substantially as hereinafter more fully set forth, with the armature of the dynamo of a pivoted field-magnet capable of having its arms moved transversely on either side of the armature, so as to vary the strength of the magnetic field in which the armature rotates; second, in the combination, substantially as hereinafter more fully set forth, with the above-named means of varying the strength of the magnetic field, of a swinging index upon the front of the case containing the dynamo, which index will by its position show the successive variations in the strength of the field from maximum to minimum; third, in the combination, substantially as hereinafter more fully set forth, with the reel upon the shaft of the dynamo, of a weight for exercising a counteracting force to the pulling force, and for causing the reverse rotation of the reel; fourth, in the construction, substantially as hereinafter more fully set forth, of the circuit-interrupter used to produce a succession of intermittent currents of high electro-motive force; fifth, in the construction of the pulling-handles and the conducting-cord attached thereto, whereby simplicity of construction and perfect conduction of the electric current are obtained.

Figure 1:
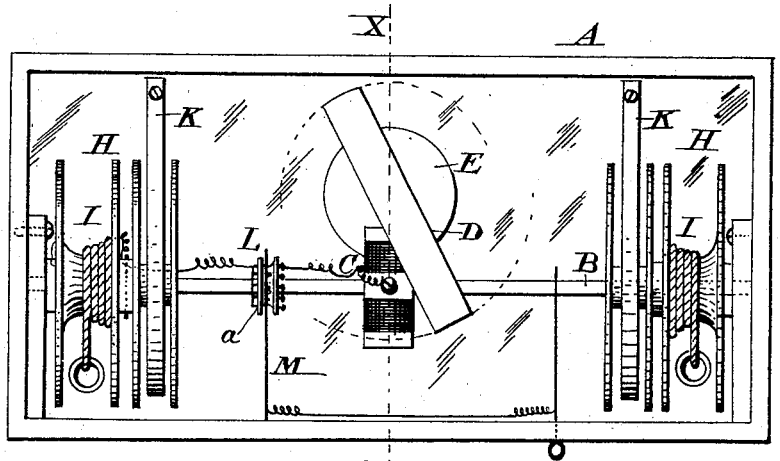
Figure 2:
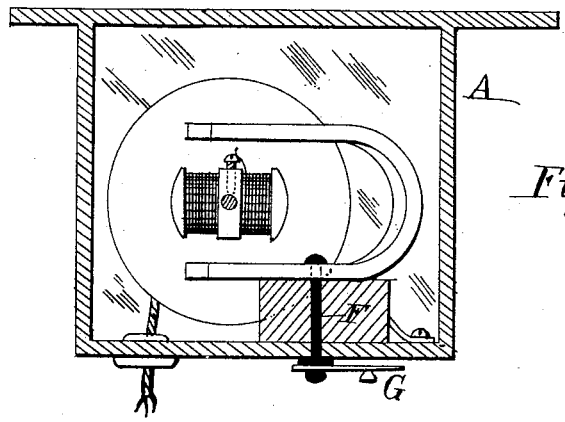
Figure 5:
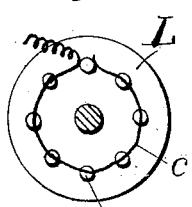
Figure 3:
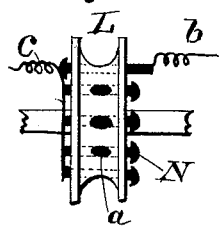
Figure 4:
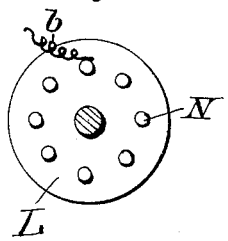

In the accompanying drawings, Figure 1 is a plan view of a machine embodying the first part of my invention. Fig. 2 is a sectional view of the same through the line $x\,x$, Fig. 1. Fig. 3 is a view of the circuit-interrupter in elevation. Figs. 4 and 5 are end views of the same. Fig. 6 is a front view in elevation of a machine in which a weight is substituted for a spring, a part being shown as broken away to show the arrangement of the weight, and which figure also shows the substitution of a spiral spring for the helical spring used in the machine shown in Fig. 1. Fig. 7 is a sectional view of the cord and handle.

Referring to the drawings, A is a rectangular case of wood or other suitable material, the dimensions of which may suitably be thirteen by eight inches. In this case is mounted longitudinally a shaft B, and this shaft carries the armature C, rotating between the arms of a horseshoe permanent magnet D. This armature is of the type known as the Siemens armature, and when it rotates in the magnetic field formed by the permanent magnet two currents are produced in the wire surrounding the core of the armature, which currents flow alternately in opposite directions and rise from zero when the core of the armature is parallel with the arms of the permanent magnet to a maximum when the core is at right angles to these arms, and have an electro-motive force dependent upon the strength of the magnetic field, the length of the wire upon the cord, and the rate of rotation of the armature.

In order that it may be possible to vary the strength of the field, and the consequent strength of the current, as may be desired, the permanent magnet is attached to a disk E, of wood or other suitable material, which, by means of a shaft F, is pivoted on the inside of the case, thus enabling the poles of the magnet to be turned so far away from the armature on either side as to reduce the number of lines of force cut by the wire of the armature to such an extent that practically no current will be produced when the armature rotates, or to be placed in any position intermediate between this and that in which the greatest number of lines of force are cut by the wire of the armature, which will be when the longitudinal axis of the magnet is at right angles with the shaft upon which the armature is fixed.

The shaft F projects through the side of the case, and to the end of this shaft is attached at right angles an index-arm G. When the poles of the permanent magnet are in such a position relatively to the armature that the field in which the armature rotates is at its maximum strength the index will be in a vertical position on the case, as shown in dotted lines, Fig. 1, and by turning the index on either side the magnet will be correspondingly swung and the strength of the field will be correspondingly diminished until reduced to a practical minimum, when the index is in the position shown in full lines. It will thus be seen that the person using the machine can make a delicate and accurate adjustment of the strength of the field as may be desired, and can at will use the apparatus as a simple exercising-machine or with a current of any desired strength within the limits afforded by the power of the dynamo.

Suitable stops limit the swing of the magnet on either side.

Instead of a permanent magnet, I can use as a field-magnet an electro-magnet excited by the currents produced by the rotation of the armature, and I can use any form of rotating armature other than a Siemens armature. The armature may be of the form which produces a continuous current, and a commutator may be provided for converting the alternate currents into currents in one direction.

It is obvious that in an exercising machine the handles and their corresponding reels must be capable of independent movement. In the machine described in the patent before referred to this result is accomplished by the provision of the independent shafts placed end to end, each of which has a reel attached thereto and one of which shafts carries the rotating armature of the magneto-dynamo. In the machine described herein there is only one shaft; but one of the reels is fixed on the shaft and the other is loose upon it. Referring to the drawings, H H are the reels, I I are the cords wound on the same, J J are the handles, and K K are the retracting-springs, one end of each of which is secured to the case and the other to the reel, so that when the cord is pulled out the spring is wound up.

One of the forms in which electricity is advantageously used as a therapeutic agent is as a succession of intermittent currents of high electro-motive force, which are applied to the nerves and muscles. In the electric apparatus usually used for medical purposes these currents are produced by the action of an induction-coil, in the primary circuit of which a continuous current of low electro-motive force derived from a galvanic battery is rapidly interrupted by means of an automatic circuit-interrupter known as a "rheotome," thus generating by induction in the secondary circuit of the induction-coil a succession of currents of high electro-motive force. It is desirable that the currents produced by the electric exercising-machine should be of this character, and as the alternate currents generated by the rotation of the armature of the magneto-dynamo are not intermittent, but are fluctuating and have not sufficient electro-motive force to produce the desired physiological effects, it is desirable to combine with the apparatus a device for converting these fluctuating currents into intermittent currents of high electro-motive force. This device acts to rapidly open and close the currents generated in the coils of the armature by its rotation in the field of force, and then by what is known as "self-induction" produce on these coils intermittent currents of much higher electro-motive force than those due to the rotation of the armature, and which are similar to those produced by an induction-coil and have the same physiological action.

My electric exercising apparatus therefore, in addition to being useful as a means for obtaining suitable and beneficial physical exercise, can also be used for obtaining electric currents in place of the induction apparatus generally used for medical purposes. The currents produced can be conveyed by suitable electrodes to any part of the body.

The device for breaking and closing the electric circuit in the coils of the armature consists of a cylinder of hard rubber or of some other suitable insulating material placed upon the shaft of the device or connected therewith so as to rotate with the armature. Upon the periphery of this cylinder are a series of metallic surfaces, separated from one another by some insulating material. A spring M bears upon these surfaces and is connected electrically through the shaft B to one end of the wire upon the armature. The other end of the wire on the armature is connected to one of the metallic surfaces, and these surfaces are electrically connected together. When the spring M on the rotation of the cylinder comes into contact with a metallic surface, a circuit is established through the coils of the armature, and when the spring comes into contact with an insulating-surface the circuit through the spring is broken. Each of the cords contains a wire, which is connected to a metallic ring W on the handle attached to the cord. The wire in one of these is electrically connected to the metallic surfaces on the circuit-interrupter, and the wire in the other cord is electrically connected to the shaft B, and thus to one end of the wire in the armature. It will thus be seen that when the handles are grasped and the spring M is in contact with the insulating-surfaces of the circuit-interrupter the path of the current from the armature is through the body of the person holding the handles; but when the spring M on the rotation of the circuit-interrupter comes into contact with a metallic surface on the same the current through the handles is broken and the armature is short-circuited. This short-circuiting of the armature takes place as many times during its rotation as there are metallic surfaces on the circuit-interrupter, and each time that the circuit is established through the handles or the electrodes a current is produced by induction in accordance with well-known laws, which is of much higher electro-motive force than that generated directly by the rotation of the armature in the field of force. The number of metallic surfaces in the circuit may be as many as convenience of construction will admit of, but in practice twelve will be found to give a sufficient number of intermittent currents.

I am aware that a circuit-interrupting device has been used in some forms of electro-medical apparatus in which the current is derived from a magneto-electric machine. I therefore do not claim the same. The manner in which I construct this circuit-interrupter is, I believe, new with me, and is advantageous in that it enables the circuit-interrupter to be made very easily and cheaply. The cylinder L is made of hard rubber or of some other suitable insulating material. In this cylinder is inserted a series of pins N N, of brass or other suitable metal, at equal distances apart and parallel with and concentric to the shaft on which the cylinder is placed. A groove is then turned upon the periphery of the cylinder of sufficient depth to expose the surface of these pins, thus forming in the groove a series of conducting and insulating surfaces. The pins are connected by the wire c on one side of the cylinder L, and on the other side of the said cylinder one of the pins is connected by the wire b to one end of the wire upon the armature. The wire b is connected to the wire in one of the cords.

Referring to Fig. 6, means are shown whereby the substitution of weights for springs may be conveniently accomplished. This machine is similar in construction to that shown in Fig. 1, but is preferably of larger dimensions. The spring is removed from the reel, and to the reel is attached a cord O, which is wound upon the spindle of the reel and is attached to it. The cord is carried over a pulley P and the other end attached to the case. A platform Q is attached to the pulley, and this platform slides upon parallel guiding-rods R R, attached to a vertical bar S S, attached to the case. Weights T of suitable size may be placed upon the platform, and the number of these weights varied, as may be desired, according to the amount of force which it is desired to exert upon the pulling-cords.

Pulling upon the handles will wind up the cord O upon the spindle of the reel, and when tension upon the handles is relaxed the weights will act to unwind the cord O and wind up the cord I upon the spindle of the reel. The weight may be attached directly to the cord; but the device shown is a convenient manner of arranging the weights. Instead of a weight, a spiral spring U may be attached by one end to the case, as shown in Fig. 6, and by its other end will be attached to the case.

The handles and conducting-cords are shown in an enlarged sectional view in Fig. 7. The cord is composed of a core d, upon which are spirally-wound three or more strands of fine wire e, and this is inclosed within a braided covering f, which is perfectly cylindrical, so as to prevent friction. The handle is composed of two cylindrical blocks of wood V V′, having spherical ends. These blocks are opposed to one another with a space between them, and then are connected by a ring of metal W, which surrounds the blocks and to which the ring is secured. The cord passes through a perforation in the block b to the space between the blocks, and is prevented by a knot or other suitable device from being withdrawn, and the wire in the cord is secured between the metallic ring and one of the blocks, thus forming a perfect electrical connection between the ring and the wire. These handles are ornamental in appearance and are convenient to grasp, and the metallic ring affords an extended conducting-surface. Any other form of handle may be used; but the form described will be found satisfactory.

Having thus described my invention, what I claim, and desire to secure by Letters Patent of the United States, is—

1. In an electric exercising-machine, the combination, substantially as and for the purpose set forth, of a rotating dynamo-armature, a pivoted field-magnet, between the arms of which the armature rotates, capable of having its arms moved transversely on either side of the armature, so as to vary the strength of the magnetic field, as may be desired.

2. In an electric exercising-machine, the combination, substantially as and for the purpose set forth, of a dynamo-armature fixed upon a rotating shaft, a field-magnet, between the arms of which the magnet rotates, a shaft attached to said magnet and turning in the case containing the dynamo parallel to the shaft carrying the armature, whereby the arms of the magnet are capable of being moved transversely on either side of the armature, so as to vary the strength of the magnetic field, as may be desired.

3. In an electric exercising-machine, the combination, substantially as and for the purpose set forth, of a dynamo-armature fixed upon a rotating shaft, a field-magnet, between the arms of which the magnet rotates, a shaft attached to the magnet and turning in the case containing the dynamo parallel to the shaft carrying the armature, and an index-arm on the outside of the case and attached to the shaft carrying the magnet.

4. In an electric exercising-machine, the combination of the shaft B, the dynamo-armature C, carried thereby, the horseshoe permanent magnet D, the shaft F, to which the magnet is attached, the disk E, supporting the magnet, and the index-arm G on the front of the case and attached to the shaft F.

5. In an electric exercising-machine, the combination, substantially as and for the purpose set forth, of a case, a shaft mounted longitudinally in said case, a dynamo-armature on said shaft, a field-magnet, between the arms of which the armature rotates, a reel fixed on the shaft and having a cord wound thereon, acting when pulled to rotate the shaft, a weight or spring attached to said shaft for counteracting the pulling force exerted upon the cord, and acting when this pulling force is relaxed to rotate the shaft in the opposite direction, a reel loose on the shaft and having a cord wound thereon, which acts when pulled to rotate the reel, a weight or spring attached to the reel for counteracting the pulling force exerted upon the cord and acting when the pulling force is relaxed to rotate the reel in the opposite direction, handles attached to the cords and having an electric conducting-surface thereon, a conducting-wire in each cord, and electric connection, whereby the currents produced by the rotation of the armature are conveyed by the handles or other electrodes through the body of the person operating the machine.

6. In an electric exercising-machine, the combination, substantially as and for the purpose set forth, of a rotating shaft, a dynamo-armature carried thereby, a circuit-interrupter connected with the shaft and rotating therewith, electric connection for conveying through the body of the person using the machine the electric currents produced by the rotation of the armature, and electric connection whereby this current is intermittently interrupted by the circuit-interrupter and short-circuited through the armature of the dynamo.

7. The circuit-interrupter consisting of the combination, substantially as and for the purpose set forth, of the cylinder of hard rubber or other suitable insulating material, the series of metallic pins inserted into the cylinder at equal distances apart and concentric to and parallel with the axis of the cylinder, a groove on the periphery of the cylinder cut to expose the pins, and an electric connection between the pins.

8. In an electric exercising-machine, the combination, substantially as and for the purpose set forth, of the rotating shaft B, the loose and fixed reels H thereon, the cords I I, attached to and wound upon each reel, respectively, and each acting when pulled to rotate the reels, cords O O, attached to and wound upon each reel, respectively, in opposite directions to the cords I I, and a weight or spring attached to each cord O and acting to counteract the pulling force exerted upon the other cord when the force is relaxed to rotate the reels in the opposite direction to that caused by the pulling ends.

9. The handle consisting of the combination, substantially as and for the purpose set forth, of the cylindrical blocks V V', opposed to one another and connected by the metallic band W.

In testimony whereof I have signed my name to this specification, in the presence of two subscribing witnesses, on this 25th day of June, A. D. 1889.

EDWARD W. ROBINSON.

Witnesses:
  A. L. GLADWIN,
  ALEX. L. HAYES.